Figure 1:
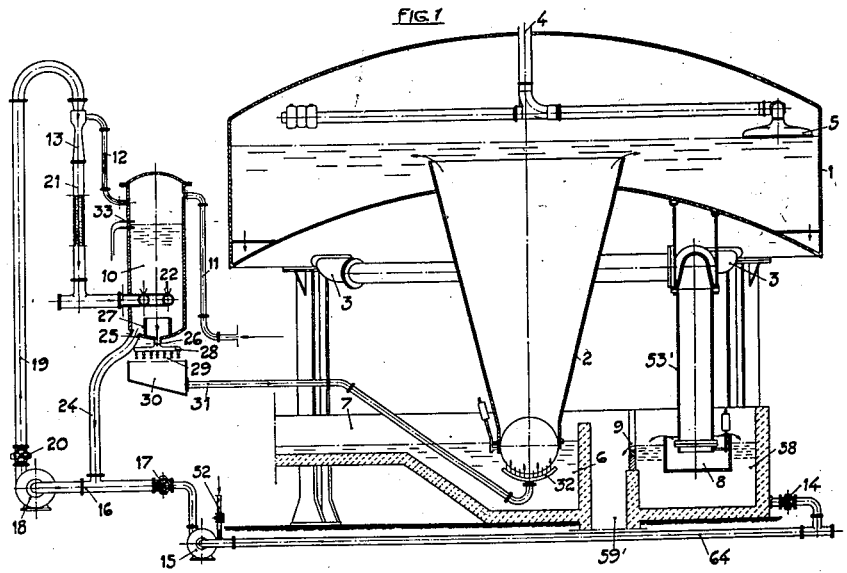

INVENTORS
JOHN OSCAR GEORG ALBREKTSSON
AND ADOLF MAGNUS RUPERT KARLSTRÖM
By Linton and Linton
ATTORNEYS

United States Patent Office 2,793,185
Patented May 21, 1957

2,793,185

METHOD AND APPARATUS FOR INTRODUCTION OF GAS INTO WATER TO BE TREATED BY FLOTATION

John Oscar Georg Albrektsson, Glimminge, and Adolf Magnus Rupert Karlström, Goteborg, Sweden Application December 16, 1953, Serial No. 398,552

Claims priority, application Sweden December 17, 1952

6 Claims. (Cl. 210—44)

The present invention relates to methods and apparatuses for introduction of air or other gas into water to be treated by flotation. This flotation is carried out in a tank in which the solid particles in the water are elevated to the water surface in the tank by small bubbles of the air or gas distributed in the water, the elevated particles being then removed from the water surface.

In order to obtain best results by the flotation, the air or gas introduced into the water to be treated should contain only very small bubbles. Large bubbles have vis. no tendency to adhere to the particles or flocs in the water but strive only to reach the water surface as soon as possible. In this movement they will cause detrimental flows in the water and break up the flocs.

In the purification of waste water of the paper industry it has been proposed to conduct a small portion of the waste water before purification thereof through a froth generator in which the water with addition of froth forming chemicals is treated by a rapidly rotating propeller to form froth which is thereafter introduced into the primary water. The air bubbles of the froth will, however, be too large to be used with advantage for the flotation.

According to the invention the air or other gas required for the flotation is first under overpressure substantially dissolved in a quantity of liquid that is small in relation to the quantity of water to be treated by flotation and then the air dispersion formed by sudden reduction of the pressure on the liquid is introduced into the water to be purified.

Thus, in the present invention, preferably pure water in a quantity that is small in relation to the water to be purified by flotation is caused in a receptacle to take up air under pressure. When this water flows out from the receptacle and the pressure is rapidly reduced, the dissolved air will separate as extremely small air bubbles forming with the water a dispersion with very great stability. This dispersion is mixed with the water to be purified at or before the entrance of the latter into the flotation tank. The quantity of the air of the dispersion is in proportion to the pressure used and the saturation degree of the water, and in accordance therewith the air dispersion has a more or less milky colour. In the present invention there are no difficulties in controlling the quantity and distribution of the air in the water to be treated according to requirements and desire.

Introduced into the water to be processed the air dispersion proves to be an ideal flotation agent. The quantity of the dispersion in relation to the quantity of water to be processed is very small, the production thereof is very cheap, it does not destroy the flocs in the water, does not change the character of the pulp or substance separated by the flotation and, what is very important, leaves no traces in the water purified in opposition to froth produced, for example, from rosin glue.

In first instance this fact depends on the colloidal or almost colloidal size of the air bubbles enabling the adhering thereof to very small particles in the water. During the flotation time the bubbles do not attain such a size as will entail a removal of the bubbles from the particles or flocs.

The dispersion agent as a rule is water but it may instead be another liquid. In the use of water it will be practical to employ pure water. Preferably, water already purified by the flotation is used for the preparation of the dispersion.

Two embodiments of an apparatus for carrying out the present method are shown in the drawings enclosed. Figure 1 shows one and Figure 2 the other embodiment.

Referring first to Figure 1, apart from the central inlet tube 2, the peripheral discharge tubes 3 and the rotatable suction pipe 4 extending through the top wall of the tank, the known type of flotation tank shown is closed. The suction conduit 4 with the nozzle 5 provides for the maintenance of a constant level and a corresponding constant reduced pressure in the tank 1 and removes the pulp or substance ascended to the surface of the water in the tank. The inlet tube 2 dips into the water to be processed in a box 6 into which it enters through a channel 7. The common assembly-tube 53' for the discharge tubes 3 dips down into a box 8 serving as water trap, said box being adjustable at a suitable height. From the box 8 the purified water flows down into an assembly-box 58 from which it is discharged for various purposes. Surplus water flows over a wall 9 to the drain channel 59'.

For producing the air dispersion used in the flotation, a closed receptacle 10 for instance of the type as an ordinary hydrophor, which is filled with liquid, usually water, to a suitable height, is provided. To the upper portion of the receptacle, a pipe 11 is connected through which air at substantially constant pressure is introduced. In the experiments made up to now, a pressure of five atm. has been used. In the receptacle 10 an air cushion is formed which delivers the air required for the saturation of the water. In order to get a large contact surface between air and water, the water is caused to circulate through a conduit 21 in which an ejector 13 is provided. This ejector takes the air from said air cushion in the receptacle and mixes it with the circulating water. In order to increase the mixing effect, dispersion means, as for instance nylon brushes 23, are provided in the conduit behind the ejector. Through a pipe 24 connected with the lower part of the receptacle 10, and pipe 16, the water enters the pump 18 which produces the overpressure required for the circulation, passes then through the ejector 13 which sucks air from the upper part of the receptacle 10 through the pipe 12 and mixes this air with the water. Through the pipe 21, in which the brushes 23 are located, the water is conducted back to the receptacle 10 through an annular perforated pipe 22 positioned slightly above the outlet opening 25.

Having been saturated with air under pressure, the water is discharged through a pipe 26 at the bottom of the receptacle 10. In order to prevent free air bubbles from following the water through the outlet 25, a collar 27 is provided all round said outlet. The pipe 26 ends in a branch pipe 28 on which small cocks or valves 29 are fitted. When passing these cocks, with the aid of which the quantity of the discharge liquid is controlled, the pressure suddenly ceases and the liquid, generally water, saturated with air, is converted into the air dispersion wanted. This is received by a container 30, and from here it is conducted to the place of consumption which in the embodiment shown in Figure 1 is the space below the inlet tube 2. In order to attain a good distribution of the dispersion in the ascending water, the dispersion is allowed to stream out through a perforated pipe system 32. The water taken out of the cocks 29 is replaced by water from the pump 15 which through the valve 17 and the circulation system 16, 18, 20, 19, 13, 21 and 22 forces the water required into the receptacle 10.

The electromotor belonging to the pump 15 is controlled by the water level in the receptacle 10 through electrodes 33 inserted into the wall of the receptacle, and thus said level can only vary between the two electrodes. The water used for preparing the air dispersion is suitably taken from the purified water in the box 58 through the valve 14 and the conduit 64. The system operates automatically, and the air dispersion is taken out continuously in the desired quantity.

It will be clear from the nature of the invention that the method is not limited to its use in conjunction with the type of flotation apparatus shown by Figure 1, but flotation apparatuses of all types may be used for carrying out the present method.

Figure 2:
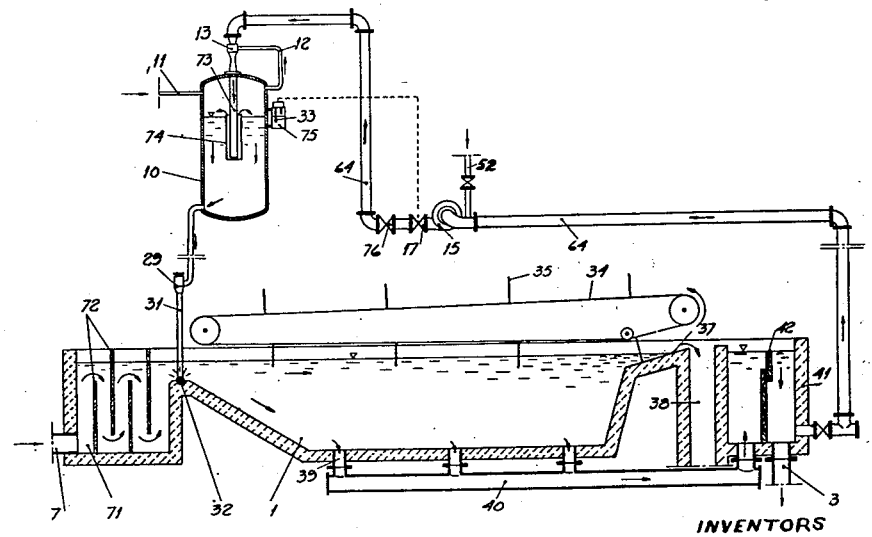

Figure 2 shows, for example, a second embodiment of the arrangement for preparing the air-water dispersion in connection with a flotation apparatus working under atmospheric pressure. 1 indicates an open rectangular flotation tank to one end of which a second tank 71 is connected. The water to be processed is supplied through a conduit 7 to the tank 71 in which the solid substance of the water by addition of chemicals is flocculated to form such units that they may be caught by the dispersion bubbles. The dispersion is introduced into the water through a perforated pipe 32 provided, for example, above the intermediate wall between the tanks 1 and 71. The pulp or substance floated up to the surface is pushed up an inclined plane 37 by the aid of a slowly running scraping arrangement 34—36 and falls down into the shaft 38. The purified water is discharged through openings 39 at the bottom of the tank 1 and is conducted to the level box 41 through the conduit 40. From the level box 41 the water flows over the adjustable wall 42 to the outlet 3.

The air dispersion used for the flotation is prepared by means of an arrangement the principal construction of which is made clear by the drawing. As in the first embodiment, 10 denotes a closed receptacle, to which the conduit 11 for compressed air and conduit 64 for water are connected. Between the pipe 64 and the receptacle 10 an ejector 13 is provided. To the ejector 13 a pipe 73 in the receptacle 10 is connected, and this pipe dips into the liquid in the receptacle. The pipe 73 is surrounded by a socket 74. For discharging the water saturated with air a pipe conduit 26 is connected to the bottom of the receptacle, and this conduit by means of the adjustable pressure reducing valve 29 and the conduit 31 is connected with the distribution pipe 32.

The water for the dispersion is taken from the box 41, supplied through the conduit 64 to the pump 15 by which it is forced through the conduit 64, ejector 13 and pipe 73 to the receptacle 10. The ejector takes air through the conduit 12 from the air space in the receptacle 10. The air will be intimately mixed with the water which is saturated with air corresponding to the pressure in the receptacle. The socket 74 prevents free air bubbles from following the discharged air saturated water. In Figure 2 it is also indicated that the water level in the receptacle 10 is controlled by the electrodes 33 which are provided in a small container 75 communicating with the receptacle 10, said electrodes by suitable means operating the valve 17 in the conduit 64. A non-return valve 76 is also provided in this conduit 64.

The manner of operation is substantially the same as described in connection with the first embodiment, and a further description thereof thus is superfluous.

An addition of chemicals of suitable quantities and kinds to the water or liquid affects the electrical charge and other properties of the dispersion air, and the adhering and ascending properties of the bubbles may be increased thereby. The chemicals are supplied in the form of solutions through the pipe 52.

What we claim is:

1. A method for separating solid particles from a confined stream of water by flotation consisting in placing continuously under over-pressure a quantity of liquid which is relatively small in comparison to and separate from the quantity of water to be subjected to flotation, dissolving air, required for the flotation, in said liquid under the over-pressure, continuously removing said liquid with air dissolved therein from under the over-pressure for sudden reduction of the pressure thereon and forming under the reduced pressure an air dispersion in said liquid with extremely fine air bubbles therein, subsequently continuously introducing said liquid and air bubble dispersion into said stream of water causing the solid particles of the water to be lifted to the water surface by the bubbles of said air dispersion, and removing the solid particles lifted to the water surface.

2. A method for separating solid particles from a stream of water in a confined area by flotation consisting in continuously supplying a liquid into a confined area which is relatively small in comparison to and separate from the area of confinement of said water to be treated by flotation, dissolving air, required for the flotation, into the confined liquid under overpressure, continuously discharging said liquid with dissolved air therein from its confined area for the sudden reduction of the pressure thereon and forming, under the reduced pressure, an air dispersion with extremely fine air bubbles in said liquid, subsequently continuously introducing said liquid with the fine air bubbles therein into said area of confinement of said stream of water causing the solid particles of the water to be lifted to the water surface by the air bubbles of said dispersion, and removing the solid particles lifted to the water surface.

3. A method of separating solid particles from a stream of water in a confined area by flotation consisting in continuously supplying clarified water into a confined area which is relatively small in comparison to and separate from the confined area for said water to be treated by flotation, continuously supplying air required for the flotation into said liquid under overpressure under which the air supplied is dissolved into said clarified water, abruptly and continuously discharging said liquid with air dissolved therein from its confined area for reducing the pressure thereon and forming under the reduced pressure a stream of an air dispersion with substantially solely extremely fine air bubbles, subsequently continuously delivering said stream of air dispersion with extremely fine air bubbles thus produced into the stream of water to be treated by flotation causing the solid particles to be lifted to the water surface by bubbles of the air dispersion, and removing the solid particles lifted to said water surface.

4. An apparatus for separating solid particles from a stream of water by flotation, comprising in combination a closed receptacle, means for continuously supplying compressed air into said receptacle, a source of liquid connected to said receptacle whereby said air and liquid are mixed under overpressure, a discharge conduit connected to said receptacle, pressure reducing means for the abrupt reduction of the pressure being provided in said discharge conduit for continuously producing an air dispersion with extremely fine air bubbles from said liquid and air passing from said receptacle through said pressure reducing means, means for receiving said liquid and air bubble dispersion, a flotation tank adapted to receive the stream of water to be treated and capable of holding a much greater quantity of water as compared to the liquid in said receptacle, a conduit connecting said liquid and air dispersion receiving means with said flotation tank, means for supplying the water stream to be treated to said tank which water supplying means is separate from said receptacle, and means for continuously removing the particles lifted to the water surface by the air bubbles of said dispersion.

5. An apparatus for separating solid particles from a stream of water by flotation, comprising in combination a closed receptacle, a source of compressed air, a conduit connecting said receptacle to said source of compressed air, a source of liquid supply, a second conduit connecting said receptacle to said source of liquid supply, an ejector provided in said second conduit, a third conduit connecting the upper portion of said receptacle, in which portion a compressed air cushion is formed, to said ejector for mixing said compressed air with the liquid therein, a pump provided for forcing the mixture of air and liquid through said ejector into said receptacle, a discharge conduit connected to said receptacle, an adjustable pressure reducing valve provided in said discharge conduit whereby an air dispersion with extremely fine air bubbles is continuously produced from said liquid and air passing said valve, a container receiving said dispersion under the reduced pressure, a flotation tank for continuously receiving the stream of water to be treated by flotation which tank is capable of containing a quantity of water a number of times larger than the quantity of liquid containable in said receptacle, a conduit for continuously supplying said air dispersion to said tank, and means for continuously removing the particles lifted to the water surface in the tank by the air bubbles of said dispersion.

6. An apparatus for separating solid particles from a stream of water by flotation, comprising in combination a closed receptacle, a source of compressed air, a conduit connecting said receptacle to said source of compressed air, a source of liquid supply, a second conduit connecting said receptacle to said source of liquid supply, an ejector provided in said second conduit, a third conduit connecting the upper portion of said receptacle, in which portion a compressed air cushion is formed, to said ejector for mixing said compressed air with the liquid therein, a pump connected to the inlet end of said ejector for forcing the mixture of air and liquid through said ejector into said receptacle, a discharge conduit connected to said receptacle, an adjustable pressure reducing valve provided in said discharge conduit whereby an air dispersion with extremely fine air bubbles is continuously produced from said liquid and air passing said valve, a flotation tank for continuously receiving the stream of water to be treated by flotation, said tank having a relatively large capacity as compared to the liquid capacity of said receptacle, a conduit connecting the outlet side of said pressure reducing valve with said tank for continuously supplying said air dispersion to the stream of water entering said tank for treatment by flotation, and means for continuously removing the particles lifted to the water surface in said tank by the air bubbles of said dispersion.

References Cited in the file of this patent
UNITED STATES PATENTS

| | | |
|---|---|---|
| 864,856 | Norris | Sept. 3, 1907 |
| 1,717,223 | Karlstrom | June 11, 1929 |
| 2,055,808 | Wait | Sept. 29, 1936 |
| 2,220,574 | Little et al. | Nov. 5, 1940 |
| 2,324,400 | Kelly et al. | July 13, 1943 |
| 2,330,589 | Juell | Sept. 28, 1943 |
| 2,446,655 | Lawrason | Aug. 10, 1948 |
| 2,606,150 | Thorp | Aug. 5, 1952 |